US010014593B2

(12) United States Patent
Heeter et al.

(10) Patent No.: US 10,014,593 B2
(45) Date of Patent: Jul. 3, 2018

(54) CONDUCTIVE SLEEVED FASTENER ASSEMBLY

(71) Applicant: The Boeing Company, Chicago, IL (US)

(72) Inventors: Russell J. Heeter, Sammamish, WA (US); Thu A. Nguyen, Mukilteo, WA (US); John A. Ward, Bonney Lake, WA (US); John R. Porter, Lynwood, WA (US); Jeffrey A. Wilkerson, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/138,524

(22) Filed: Apr. 26, 2016

(65) Prior Publication Data
US 2016/0240939 A1 Aug. 18, 2016

Related U.S. Application Data

(62) Division of application No. 13/758,539, filed on Feb. 4, 2013, now Pat. No. 9,331,402.

(51) Int. Cl.
F16B 33/00 (2006.01)
F16B 33/06 (2006.01)
(Continued)

(52) U.S. Cl.
CPC ............ H01R 4/304 (2013.01); B64D 45/02 (2013.01); F16B 33/06 (2013.01); H01R 43/16 (2013.01);
(Continued)

(58) Field of Classification Search
CPC .......... H01R 4/304; H01R 4/308; H01R 4/16; B64D 45/02; F16B 33/06; F16B 33/006;
(Continued)

(56) References Cited

U.S. PATENT DOCUMENTS 3,130,991 A * 4/1964 Piragino ............... F16C 11/045
384/125
3,355,205 A * 11/1967 Wagner ............... F16B 25/0031
29/458

(Continued)

FOREIGN PATENT DOCUMENTS

EP 1903221 3/2008
EP 1903221 A2 3/2008
(Continued)

OTHER PUBLICATIONS

ARP5577 "Aircraft Lightning Direct Effects Certification" http://standards.sae.org/arp5577, Sep. 30, 2002.
(Continued)

Primary Examiner — Bayan Salone
(74) Attorney, Agent, or Firm — Parsons Behle & Latimer

(57) ABSTRACT

A conductive fastener assembly, system, and method, wherein the fastener assembly includes a fastener, a fastener sleeve, a nut, and a lubricant coating. The lubricant coating is deposited on a distal portion of a fastener shank and is omitted from the rest of the fastener. To overcome the stresses placed on the fastener sleeve by the insertion of the fastener shank largely devoid of a lubricant coating, the fastener sleeve is reinforced by one or more of an increased thickness, a high-strength alloy, and a soft metal coating.

17 Claims, 5 Drawing Sheets

(51) Int. Cl.
*B64D 45/02* (2006.01)
*H01R 43/16* (2006.01)
*H01R 4/30* (2006.01)
*F16B 1/00* (2006.01)

(52) U.S. Cl.
CPC ..... *F16B 33/006* (2013.01); *F16B 2001/0064* (2013.01); *H01R 4/308* (2013.01); *Y10T 29/4998* (2015.01); *Y10T 29/49982* (2015.01)

(58) Field of Classification Search
CPC ......... F16B 2001/0064; Y10T 29/4998; Y10T 29/49982
USPC ....... 29/527.1, 527.2; 411/366.1, 366.2, 367, 411/368, 369, 383
See application file for complete search history.

(56) References Cited

U.S. PATENT DOCUMENTS

| | | | |
|---|---|---|---|
| 3,461,769 A * | 8/1969 | Brosseit | F16B 5/0233 403/408.1 |
| 3,485,132 A * | 12/1969 | Hanny | F16B 15/0092 29/458 |
| 3,498,352 A * | 3/1970 | Duffy | B05B 1/044 118/308 |
| 3,639,137 A * | 2/1972 | Marinelli | F16B 15/0092 411/548 |
| 3,653,675 A * | 4/1972 | Schaefer | F16B 33/004 277/650 |
| 3,667,340 A * | 6/1972 | Black | F16B 19/008 411/38 |
| 3,746,068 A * | 7/1973 | Deckert | F16B 33/06 411/258 |
| 3,820,297 A * | 6/1974 | Hurd | F16B 19/1054 403/2 |
| 3,835,612 A | 9/1974 | Beziat | |
| 3,835,615 A * | 9/1974 | King, Jr. | B23P 9/025 248/909 |
| 4,023,882 A * | 5/1977 | Pettersson | H01R 4/26 439/426 |
| 4,102,036 A | 7/1978 | Salter | |
| 4,260,005 A * | 4/1981 | Stencel | F16B 31/02 29/510 |
| 4,405,256 A | 9/1983 | King, Jr. | |
| 4,556,439 A | 12/1985 | Bannink, Jr. | |
| 4,755,904 A * | 7/1988 | Brick | B64D 45/02 244/1 A |
| 4,850,771 A | 7/1989 | Hurd | |
| 5,123,792 A * | 6/1992 | Strobel | F16B 19/1063 411/43 |
| 5,141,373 A * | 8/1992 | Kendall | F16B 19/1063 403/408.1 |
| 5,391,028 A * | 2/1995 | Charles | F16B 37/145 244/1 A |
| 5,577,854 A * | 11/1996 | Jacob | B60G 7/00 280/93.508 |
| 5,860,778 A * | 1/1999 | Keener | B23P 19/065 29/428 |
| 5,895,186 A * | 4/1999 | Giannuzzi | C09J 9/005 411/258 |
| 6,149,363 A * | 11/2000 | March | B21H 3/06 411/366.1 |
| 6,305,991 B1 * | 10/2001 | Gerster | H01R 4/26 439/801 |
| 6,357,953 B1 * | 3/2002 | Ballantyne | F16B 5/0233 403/365 |
| 6,776,566 B2 | 8/2004 | Kobusch et al. | |
| 7,195,437 B2 | 3/2007 | Sakamoto | |
| 7,695,226 B2 * | 4/2010 | March | F16B 5/02 411/339 |
| 7,898,785 B2 * | 3/2011 | Winter | B64D 37/32 361/117 |
| 7,950,885 B2 | 5/2011 | Rosenkranz | |
| 8,312,606 B2 * | 11/2012 | Reid | B21J 15/022 29/263 |
| 8,382,413 B2 * | 2/2013 | Nguyen | B64D 45/02 411/383 |
| 8,475,102 B2 * | 7/2013 | Haylock | B64D 45/02 411/361 |
| 9,331,402 B2 * | 5/2016 | Heeter | B64D 45/02 |
| 9,343,824 B2 * | 5/2016 | Heeter | B64D 45/02 |
| 2004/0005207 A1 * | 1/2004 | Wallace | F16B 43/002 411/428 |
| 2008/0075555 A1 * | 3/2008 | March | F16B 5/02 411/361 |
| 2009/0178262 A1 * | 7/2009 | Reid | B21J 15/022 29/263 |
| 2010/0124472 A1 * | 5/2010 | Nguyen | B64D 45/02 411/337 |
| 2011/0142567 A1 * | 6/2011 | Haylock | B64D 45/02 411/360 |
| 2013/0124472 A1 | 5/2013 | Srivastava et al. | |

FOREIGN PATENT DOCUMENTS

| | | |
|---|---|---|
| JP | 2013224142 | 10/2013 |
| JP | 2013249917 | 12/2013 |
| WO | WO8705976 | 10/1987 |
| WO | 1999051494 | 10/1999 |
| WO | WO2011050040 | 4/2011 |

OTHER PUBLICATIONS

ARP5412 "Aircraft Lightning Environment and Related Test Waveforms" http://standards.sae.org/arp5412/, Nov. 1, 1999.
US Patent and Trademark Office; Office Action for U.S. Appl. No. 13/728,804 dated Dec. 19, 2013.
International Searching Authority; International Search Report and Written Opinion issued in PCT/US2013/077387 and dated Mar. 21, 2014.
International Searching Authority; International Search Report and Written Opinion issued in Serial No. PCT/2013/077087 dated Feb. 28, 2014.
US Patent and Trademark office; Office Action issued in U.S. Appl. No. 12/272,553; dated Jul. 6, 2011.
US Patent and Trademark Office; Office Action issued in U.S. Appl. No. 12/272,553; dated Sep. 14, 2011.
US Patent and Trademark Office; Office Action issued in U.S. Appl. No. 12/272,553; dated Feb. 15, 2012.
US Patent and Trademark Office; Office Action issued in U.S. Appl. No. 12/272,553; dated Jun. 19, 2012.
US Patent and Trademark Office; Office Action issued in U.S. Appl. No. 13/728,804; dated Aug. 1, 2014.
US Patent and Trademark Office; Office Action issued in U.S. Appl. No. 13/728,804; dated Nov. 5, 2014.
US Patent and Trademark Office; Office Action issued in U.S. Appl. No. 13/758,612; dated Nov. 6, 2014.
US Patent and Trademark Office; Office Action issued in U.S. Appl. No. 13/758,612; dated Jan. 16, 2015.
US Patent and Trademark Office; Office Action issued in U.S. Appl. No. 13/758,539; dated Mar. 12, 2015.
US Patent and Trademark Office; Office Action issued in U.S. Appl. No. 13/758,612; dated Apr. 13, 2015.
US Patent and Trademark Office; Office Action issued in U.S. Appl. No. 13/758,612; dated Jun. 23, 2015.
The International Bureau of WIPO; International Preliminary Report on Patentability for Application No. PCT/US2013/077387; dated Aug. 13, 2015.
The International Bureau of WIPO; International Preliminary Report on Patentability for Application No. PCT/US2013/077087; dated Aug. 13, 2015.
US Patent and Trademark Office; Office Action issued in U.S. Appl. No. 13/758,539; dated Sep. 1, 2015.

(56) References Cited

OTHER PUBLICATIONS

Japan Patent Office; Office Action; Japan Patent Application No. 2015-556011; dated Nov. 20, 2017.

* cited by examiner

CONDUCTIVE SLEEVED FASTENER ASSEMBLY

CROSS-REFERENCE TO RELATED APPLICATIONS

This application is a divisional of and claims the benefit of U.S. patent application Ser. No. 13/758,539 filed on Feb. 4, 2013 and entitled "Conductive Sleeved Fastener Assembly," the contents of which are hereby incorporated by reference in their entirety.

FIELD

The disclosure relates to fasteners for fastening structures to each other. More particularly, the disclosure relates to a conductive sleeved fastener assembly which provides an electrically-conductive interface between a fastener sleeve and a fastener.

BACKGROUND

In some aerospace applications, it may be desirable to secure structures to each other using a fastener. A fastener having a diameter which is greater than the diameter of a fastener opening provided in the structures to be secured may be forced into the fastener opening to achieve an interference fit of the fastener in the fastener opening. In many cases, a lubricant such as cadmium, for example, may be coated on the fastener shank to provide the necessary lubricity to insert the fastener in the fastener opening. In the case of composite structures and titanium structures, however, it may be desirable to use a sleeved fastener.

In order to reliably install a sleeved fastener into sleeve openings provided in the structures, the fastener is often lubricated with a finish coating such as a pin coating. This coating reduces the risk of a material failure of the fastener sleeve as the fastener is installed into the fastener sleeve. In some applications, multiple lubricants may be applied to lubricate the fastener shank in the sleeve. These lubricant(s) may be applied to the fastener shank and/or to the interior surface of the sleeve. The lubricants may have the effect of electrically insulating the fastener from the fastener sleeve. In some applications, it may be desirable to enhance the electrical conductivity between the fastener and the fastener sleeve while maintaining the integrity of the fastener sleeve.

Therefore, a conductive sleeved fastener assembly which provides an electrically-conductive interface between a fastener sleeve and a fastener that can be installed successfully without a lubricant may be desirable for some applications.

SUMMARY

The disclosure is generally directed to a conductive sleeved fastener assembly and system and a method for preparing such. An illustrative embodiment of the sleeved fastener assembly includes a fastener, a fastener sleeve, and a nut attached to a fastener shank of the fastener. The nut is prepared having a counterbore that maintains a desired gap between the nut and the fastener sleeve, in both radial and axial directions.

One aspect of the present disclosure provides a conductive sleeved fastener assembly comprising an electrically-conductive fastener, an electrically-conductive fastener sleeve and a nut. The fastener comprises a fastener head and a fastener shank extending from said fastener head, the fastener shank further comprising an attachment portion located at a distal end of the fastener shank. The fastener sleeve is configured to receive the fastener shank, and includes a fastener sleeve flare at a top end of said fastener sleeve. The fastener and fastener sleeve may comprise a countersink configuration. The fastener may be reinforced, such as for example, by the application of a soft metal coating. A lubricant coating is also provided on the fastener where the attachment portion is configured to engage the nut, wherein the lubricant is omitted from a proximal portion of the fastener shank and the fastener head.

Another aspect of the present disclosure provides a conductive sleeved fastening assembly comprising an electrically-conductive fastener, and electrically-conductive fastener sleeve, a nut, and a lubricant coating. A finish coating and the lubricant coating are omitted from the fastener head and a proximal portion of the fastener shank. The fastener sleeve comprises a wall having a thickness of greater than or equal to 0.012 inches.

Yet another aspect of the present disclosure provides a method of preparing a conductive sleeved fastening assembly for use. The method comprises the steps of providing an electrically-conductive fastener and fastener sleeve, reinforcing the fastener sleeve, and depositing a lubricant on a distal portion of the fastener shank. The lubricant coating may be omitted from a proximal portion of the fastener shank and from the fastener head.

Other systems, methods, features, and advantages of the present disclosure will be or become apparent to one with skill in the art upon examination of the following drawings and detailed description. The features, functions and advantages that have been discussed can be achieved independently in various configurations of the present disclosure or may be combined in yet other configurations further details of which can be seen with reference to the following description and drawings.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

In the following description, reference is made to the accompanying drawings, which form a part hereof, and in which is shown, by way of illustration, various configurations of the present disclosure. It is understood that other embodiments may be utilized and changes may be made without departing from the scope of the present disclosure.

Figure 1A:
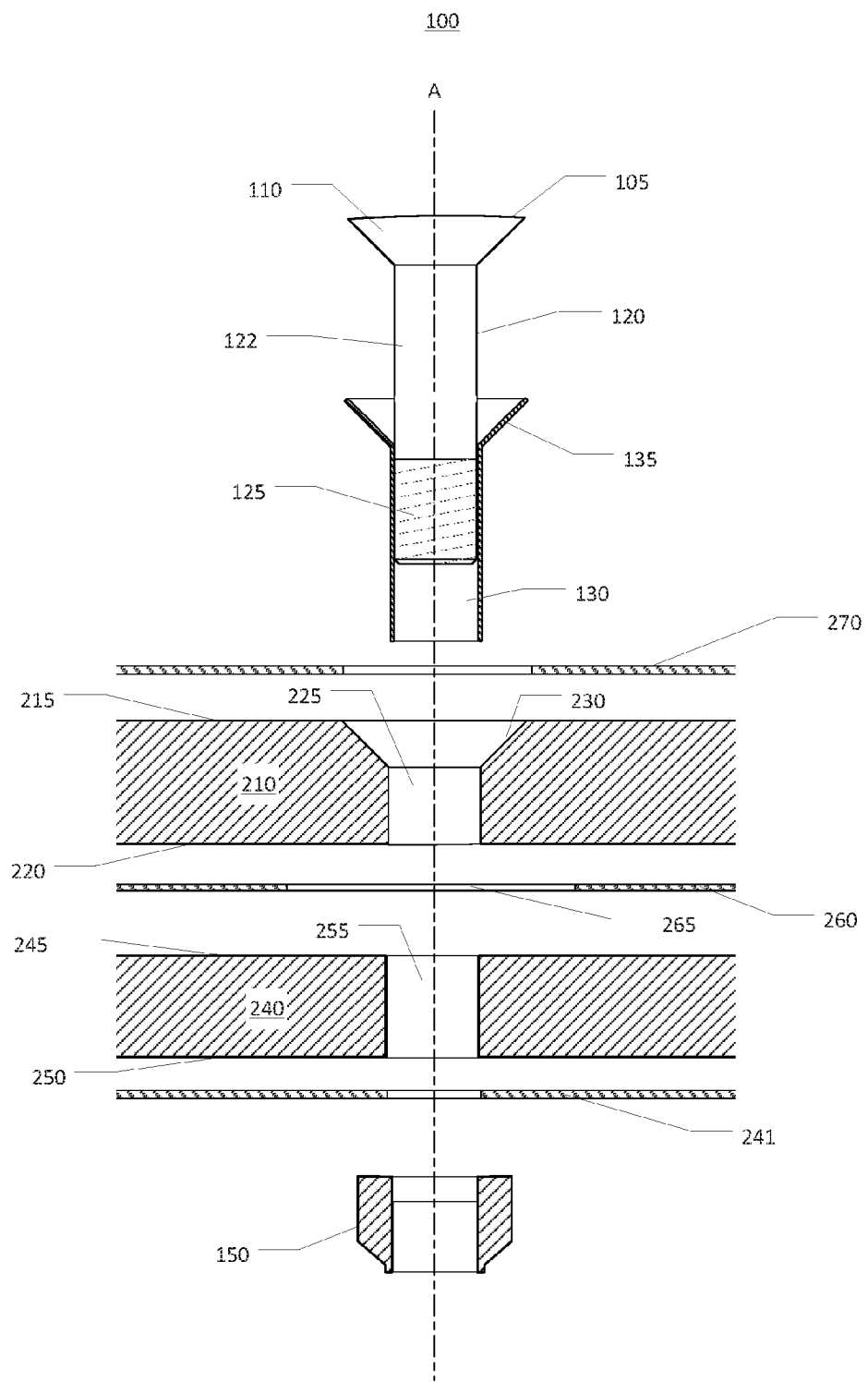
FIG. 1A is an exploded and partially sectioned view of a conductive fastening system, according to one example of the disclosure.
Figure 1B:
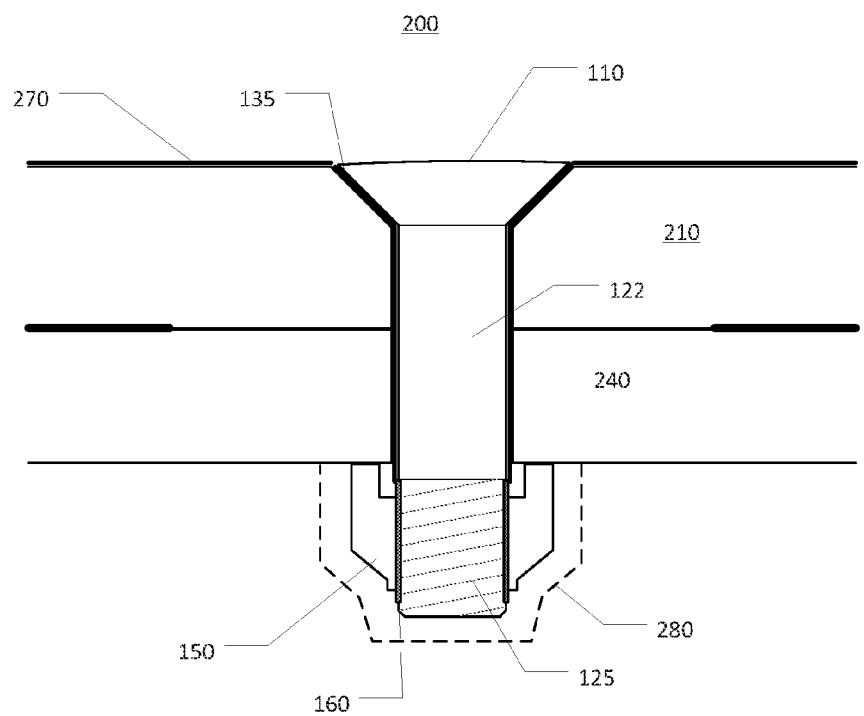
FIG. 1B is an partially sectioned view of a conductive fastening system, according to another example of the disclosure.

FIGS. 1A and 1B are illustrations depicting an example of a conductive fastening system according to the present disclosure, comprising a conductive fastener assembly 100 as part of a conductive fastener assembly 100. The conductive fastener assembly 100 includes a fastener 105, a fastener sleeve 130, and a nut 150. The fastener 105 comprises a fastener head 110 and a fastener shank 120, the fastener shank being divided into a proximal portion 122 and a distal portion 125 of the fastener shank 120. The fastener sleeve includes a flare 135. The nut 150 is arranged at a distal end of the fastener shank 120. A lubricant coating 160 may be disposed on the distal portion 125 of the fastener shank 120. FIGS. 1A and 1B further illustrate the arrangement of a first structure 210 and a second structure 240. The first structure 210 further comprises a top surface 215, a first facing surface 220, and a first hole 225. A standard countersink may be formed at the intersection of the top surface 215 and the first hole 225. The second structure 240 comprises a second facing surface 245, a bottom surface 250, and a second hole 255. The assembly may further comprises a fay seal 260, a conductive surface 270, and a bottom layer 241.

Figure 2:
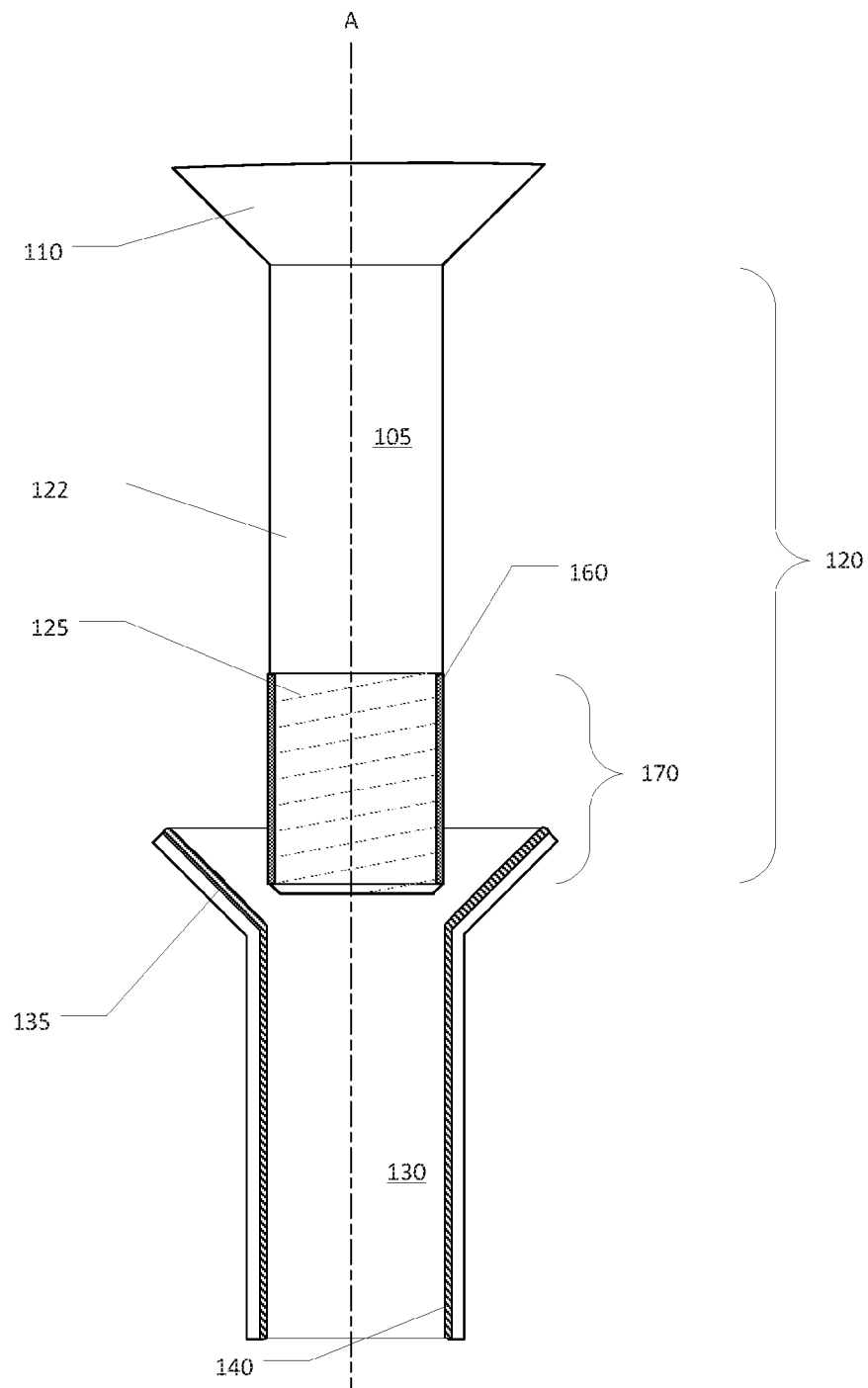
FIG. 2 is a detailed view of an electrically-conductive fastener and an electrically-conductive fastener sleeve, in accordance with another example of the disclosure.

FIG. 2 illustrates an electrically-conductive fastener 105 and an electrically-conductive fastener sleeve 130 according to another example of the present disclosure. An electrically-conductive fastener 105 may include a fastener head 110 and a fastener shank 120 which extends from the fastener head 110. The surface of the fastener head 110 may be a bare metal surface without a coating or solid film lubricant. A solid film lubricant, as used herein may include coatings of very fine particles of lubricating solids that may be suspended in a binder. The fastener shank 120 of the fastener 105 may extend through the fastener sleeve 130 and the fastener head 110 may engage the fastener sleeve 130. The fastener head 110 may be in direct engagement with a fastener sleeve flare 135 when the fastener 105 fully engages the fastener sleeve 130. As shown in FIG. 1B, the fastener shank 120 may extend beyond the second structure 240 and may receive a nut 150 which may be tightened against the second structure 240 or a bottom layer 241 disposed thereon.

To improve the conductivity between the sleeve and the fastener, the fastener assembly 100 may be manufactured without the addition of a finish coating 170, which may be a solid film lubricant, applied to the fastener head 110 and sleeve interface, the fastener proximal portion 122 and sleeve interface, or not applied to the fastener or sleeve altogether. Other examples, as shown in FIG. 2, apply the finish coating 170 to the distal portion 125 of the fastener shank 120, while omitting the finish coating from the proximal portion 122 and from the fastener head 110.

Similarly, a lubricant coating may be applied to the fastener 105 of the present disclosure. In order to increase the electrical-conductivity between the fastener 105 and the fastener sleeve 130, the present disclosure enables the fastener 105 to be inserted into the fastener sleeve 130 while omitting the lubricant coating 160 from the proximal portion 122 of the fastener shank 120. In the illustrated example, the distal portion 125 of the fastener shank 120 is not in contact with the fastener sleeve 130 when fully assembled. In other examples, however, the lubricant coating 160 and the fastener sleeve 130 have some amount of overlap.

To compensate for the lack of a lubricant or finish coating applied to the fastener head areas the fastener sleeve 130 may be reinforced in accordance with the present disclosure. The reinforcement of the fastener sleeve 130 increases the expected life of the fastener assembly 100 by reducing the risk of deformation or failure. The fastener sleeve may be reinforced, for example, by depositing a soft metal coating 140, such as a nickel coating, on the fastener sleeve. FIG. 2 illustrates the soft metal coating 140 on an inside surface of the fastener sleeve 130. The soft metal coating 140 may be placed on the outside of the fastener sleeve 130 in the alternative or in addition to the inside surface. Also, the soft metal coating 140 is illustrated as having been deposited on the fastener sleeve flare 135, but may be omitted from the fastener sleeve flare 135 where desired. The fastener sleeve 130 may also be reinforced by using a high-strength alloy with good electrical-conductivity to form the fastener sleeve 130. Such alloys may include, but are not limited to 6Al-4V titanium, and other alloys with similar performance characteristics. Another example of a way to reinforce the fastener sleeve 130 is to manufacture the part with a greater thickness. For example a typical sleeve, in the prior art, is often manufactured with a wall thickness of 0.008 in. to 0.010 in. In order to increase the longevity and conductivity of the fastener sleeve 130, however, the cost of manufacturing a fastener sleeve 130 to have a greater thickness may be justified. For example, a typical sleeve manufactured in accordance with the present disclosure may be manufactured having a wall thickness of 0.012 inches or more.

The fastener head 110 and the fastener sleeve flare 135 may be formed having a countersink configuration, wherein the fastener sleeve flare 135 and the facing surface of the fastener head 110 are placed at an angle that is less than 90° relative to the central axis A. Alternatively, the fastener sleeve flare 135 may comprise a flange, wherein the fastener sleeve flare 135 is approximately 90° relative to the central axis A.

While the illustrated example depicts a distal portion 125 that comprises an attachment portion that is threaded for mating with the nut 150, the nut 150 and the fastener shank 120 may be configured to employ any appropriate attachment methods known in the art, including those that may be developed. For example, the fastener and nut assembly may comprise a lockbolt and collar type system where the fastener comprises annual grooves and the nut comprises a collar is un-threaded where the inner wall of the caller is designed to flow into the annual grooves of the fastener.

The conductive fastener assembly 100 may be used in wide range of situations, and the figures depict a generic arrangement including two structures. The first structure 210 and second structure 240, may vary in thickness and material. The fastener assembly 100 may further comprise a plurality of structures, wherein the first structure 210 represents the outermost structure, i.e., where the fastener head 110 is arranged, and wherein the second structure 240 represents the innermost structure, i.e., where the nut 150 is located. The first structure 210 and the second structure 240 may be the same material or differing materials, such as a metal and a fiber-reinforced composite material.

A first hole 225 is drilled or otherwise formed in the first structure 210 and a corresponding second hole 255 is formed in the second structure 240. The location of the holes 225, 255 are chosen to result in the desired arrangement of the structures 210, 240 when the fastener assembly 100 is employed. The diameter of the holes 225, 255 is chosen in accordance with the diameter of the fastener sleeve 130, and may be configured to create an interference fit.

Referring again to FIGS. 1A and 1B, the top of the first hole 225 may be formed with a standard countersink 230 that corresponds with the countersink configuration of the fastener assembly 100. As used in the present disclosure, the term "standard countersink" is not intended to indicate a specific angle or diameter, but instead is used to differentiate the countersink illustrated from a "deep countersink" wherein the fastener head 110 would rest substantially below the top surface 215 of the first structure 210. Some examples of the fastener assembly 100 may employ a deep countersink for a particular application, but other features of the design of the fastener assembly 100 of the present disclosure is intended to reduce the need for a deep countersink for many applications.

The fastener assembly 100 may be assembled with additional features where necessary. For example, FIGS. 1A and 1B depict a conductive surface 270 that may be arranged, for example, on the top surface 215 of the first structure 210. The conductive surface 270 may be arranged on the top surface 215 using an automated process. The advantages of the present disclosure allow thinner and more easily-applied substances, such as, for example, an expanded metal foil or other thin metallic surface such as expanded copper foil, to be used as the conductive surface 270 in applications that previously required a solid copper grid on the top surface 215.

FIGS. 1A and 1B also depict a fay seal 260 disposed between the first facing surface 220 and the second facing surface 245. A fay seal is typically used for fluid exclusion and corrosion resistance and provides containment capability associated with potential sparking in this interface. The fastener assembly 100 of the present disclosure may employ a fay seal 260, and, in some instances, omit the fay seal 260 from an area 265 surrounding the fastener assembly 100. Alternatively, the fay seal 260 may be removed from the assembly where protection from electrical phenomena is not required.

Another advantage of the fastener assembly 100 of the present disclosure is that a cap seal 280 is not always required. For this purpose, the cap seal 280, denoted by the dashed outline in FIG. 1B, is shown as missing from the illustrated example.

Figure 3:
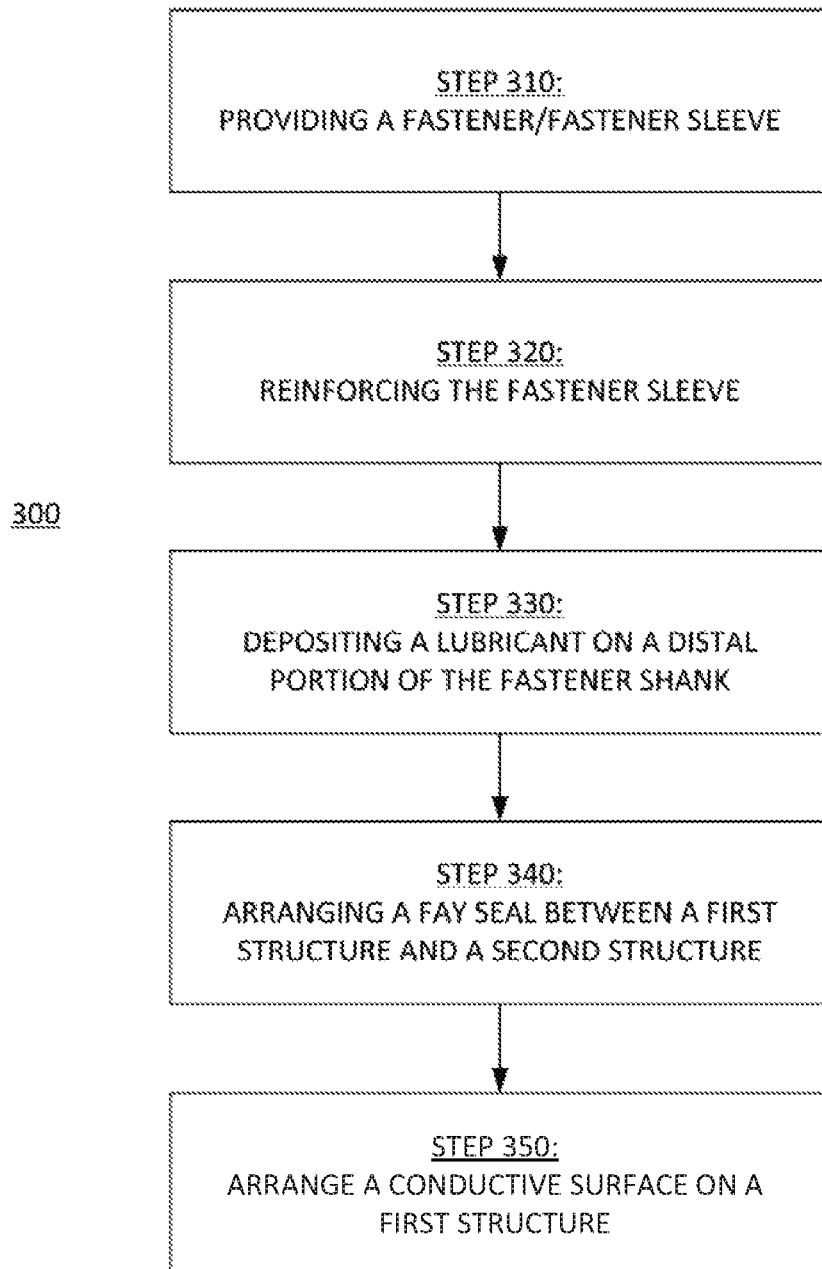
FIG. 3 is a flowchart depicting a method for preparing a fastening system, in accordance with another example of the disclosure.

FIG. 3 illustrates a method 300 of preparing a conductive sleeved fastening system for use in accordance with the present disclosure, which method 300 may comprise any or all of the following steps. Step 310 of the method 300 comprises providing a fastener having a fastener head, a fastener shank extending from said fastener head, and a fastener sleeve provided on said fastener shank and a fastener sleeve flare on said fastener sleeve. Step 320 comprises reinforcing the fastener sleeve 130 as described above. Step 330 comprises depositing a lubricant coating 160 on the distal portion of the fastener shank 120. The lubricant coating 160 may further be omitted from the proximal portion 122 of the fastener shank 120 and the fastener head 110. Step 340 comprises arranging a fay seal 260 between the first structure 210 and the second structure 240. The fay seal 260 may be omitted from an area 265 surrounding the fastener assembly 100. Step 350 comprises arranging a conductive surface 270 on a top surface 215 of a first structure 210.

Figure 4:
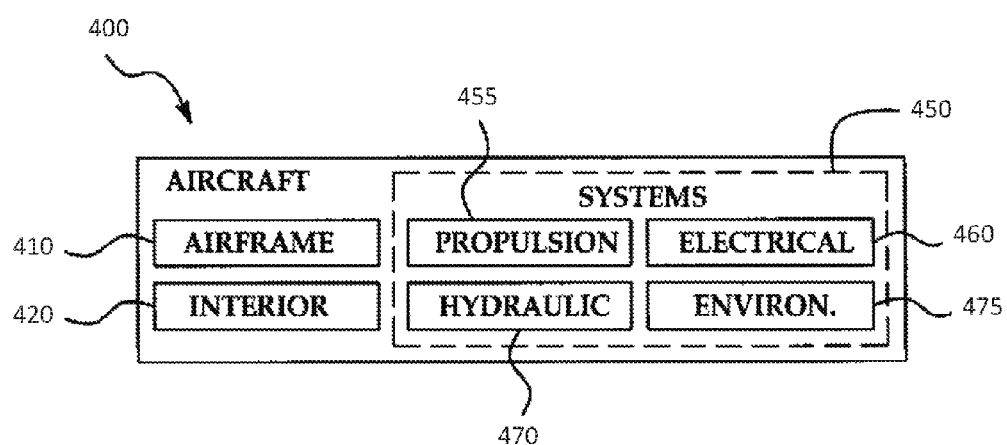
FIG. 4 is a block diagram of an aircraft, in accordance with another example of the disclosure.

As shown in FIG. 4, the aircraft 400 produced using the method 300 and/or assembly 100 described herein, may include an airframe 410 with a plurality of systems 450 and an interior 420. Examples of high-level systems 450 include one or more of a propulsion system 455 an electrical system 460, a hydraulic system 470, and an environmental system 475. Any number of other systems may be included. Although an aerospace example is shown, the principles of the disclosure may be applied to other industries, including, but not limited to, the construction and automotive industries.

The examples provided herein may be used in the context of aircraft manufacturing and service. During pre-production, an exemplary method may include specification and design of the aircraft and material procurement. During production, component and subassembly manufacturing and system integration of the aircraft takes place. Thereafter, the aircraft may go through certification and delivery in order to be placed in service. While in service by a customer, the aircraft may be scheduled for routine maintenance and service (which may also include modification, reconfiguration, refurbishment, and so on).

The various steps of the method 300 described herein may be employed during any one or more of the stages of production and service. For example, components or subassemblies corresponding to production process may be fabricated or manufactured in a manner similar to components or subassemblies produced while the aircraft is in service. Also, one or more apparatus embodiments may be utilized during the production stages, for example, by substantially expediting assembly of or reducing the cost of an aircraft. Similarly, one or more apparatus embodiments may be utilized while the aircraft is in service, for example and without limitation, to maintenance and service.

It should be emphasized that the above-described configurations of the present device and process are merely possible examples of implementations and merely set forth for a clear understanding of the principles of the disclosure. Many different configurations of the disclosure described herein may be designed and/or fabricated without departing from the spirit and scope of the disclosure. All these and other such modifications and variations are intended to be included herein within the scope of this disclosure and protected by the following claims. Therefore the scope of the disclosure is not intended to be limited except as indicated in the appended claims.

What is claimed is:

1. A method of preparing a conductive sleeved fastening assembly for use, comprising:
   providing a fastener having a fastener head, a fastener shank extending from said fastener head, and a fastener sleeve provided on said fastener shank and a fastener sleeve flare on said fastener sleeve, wherein said fastener sleeve is configured to extend through a first structure and a second structure;
   depositing a lubricant coating on a distal portion of the fastener shank, wherein the lubricant coating is omitted from a proximal portion of the fastener shank and from the fastener head; and
   applying a fay seal between the first structure and the second structure, wherein the fay seal is omitted from a horizontal area between the first structure and the second structure surrounding the fastener sleeve.

2. The method of claim 1, further comprising the step of reinforcing the fastener sleeve.

3. The method of claim 1, wherein the fastener head and the fastener sleeve flare are formed having a countersink configuration.

4. The method of claim 1, further comprising:
   arranging an expanded metal foil on a top surface of said first structure.

5. A method of preparing a conductive sleeved fastening assembly for use, comprising:
   providing a first structure, having an expanded metal foil arranged thereon;
   providing a second structure; providing a fastener, configured to attach the first structure to the second structure, having a fastener head and a fastener shank extending from said fastener head, and a fastener sleeve provided on said fastener shank and a fastener sleeve flare on said fastener sleeve;

depositing a lubricant coating on a distal portion of the fastener shank, wherein the lubricant coating is omitted from a proximal portion of the fastener shank and from the fastener head; and applying a fay seal between the first structure and the second structure, wherein the fay seal is omitted from a horizontal area between the first structure and the second structure surrounding the fastener sleeve.

6. The method of claim 5, further comprising forming the fastener head and the fastener sleeve having a countersink configuration.

7. The method of claim 5, further comprising reinforcing the fastener sleeve.

8. The method of claim 5, wherein the lubricant is a solid film lubricant.

9. The method of claim 5, further comprising applying a metal coating to the fastener sleeve.

10. A method of preparing a conductive sleeved fastening assembly, comprising:

providing a first structure;

arranging an expanded metal foil on the first structure;

providing a second structure;

attaching the first structure to the second structure with an electrically conductive fastener having a fastener head, a fastener shank extending from said fastener head, and a fastener sleeve being configured to receive said fastener shank; attaching a nut to a distal portion of the fastener shank;

depositing a lubricant coating on a distal portion of the fastener shank, wherein the lubricant coating is omitted from a proximal portion of the fastener shank and from the fastener head; and applying a fay seal between the first structure and the second structure, wherein the fay seal is omitted from a horizontal area between the first structure and the second structure surrounding the fastener sleeve.

11. The method of claim 10, wherein the fastener sleeve comprises a fastener sleeve flare at a top end thereof.

12. The method of claim 11, further comprising forming the fastener head and the fastener sleeve flare to have a countersink configuration.

13. The method of claim 10, wherein the fastener sleeve has a wall thickness that is greater than or equal to 0.012 inches.

14. The method of claim 10, further comprising forming the fastener sleeve from a high-strength alloy.

15. The method of claim 10, further comprising depositing a metal coating on the fastener sleeve.

16. The method of claim 10, further comprising reinforcing the fastener sleeve.

17. The method of claim 10, wherein the lubricant is a solid film lubricant.

* * * * *